(12) United States Patent
Wu et al.

(10) Patent No.: US 9,571,384 B2
(45) Date of Patent: Feb. 14, 2017

(54) DYNAMIC PRIORITY QUEUE MAPPING FOR QOS ROUTING IN SOFTWARE DEFINED NETWORKS

(71) Applicant: Futurewei Technologies Inc., Plano, TX (US)

(72) Inventors: Mingquan Wu, Princeton Junction, NJ (US); Miao Zhao, Santa Clara, CA (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 97 days.

(21) Appl. No.: 14/473,658

(22) Filed: Aug. 29, 2014

(65) Prior Publication Data

US 2015/0063112 A1 Mar. 5, 2015

Related U.S. Application Data

(60) Provisional application No. 61/872,487, filed on Aug. 30, 2013.

(51) Int. Cl.
| | |
|---|---|
| *H04L 12/725* | (2013.01) |
| *H04L 12/721* | (2013.01) |
| *H04L 12/715* | (2013.01) |
| *H04L 12/861* | (2013.01) |
| *H04L 12/863* | (2013.01) |

(52) U.S. Cl.
CPC ............ *H04L 45/302* (2013.01); *H04L 45/38* (2013.01); *H04L 45/64* (2013.01); *H04L 47/6215* (2013.01); *H04L 49/90* (2013.01)

(58) Field of Classification Search
CPC ...... H04L 45/302; H04L 45/38; H04L 45/121; H04L 47/6275
See application file for complete search history.

(56) References Cited

U.S. PATENT DOCUMENTS

| 8,693,374 B1* | 4/2014 | Murphy | ................. H04L 12/28 370/255 |
|---|---|---|---|
| 2012/0155264 A1* | 6/2012 | Sharma | ............... H04L 43/0852 370/232 |
| 2014/0185628 A1* | 7/2014 | Matthews | ........... H04L 47/6215 370/412 |

\* cited by examiner

*Primary Examiner* — Jeffrey M Rutkowski
*Assistant Examiner* — Thomas D Busch
(74) *Attorney, Agent, or Firm* — Conley Rose, P.C.

(57) ABSTRACT

A QoS management scheme for SDN. Network resource availability of routers and switches are maintained in a central resource database of a SDN controller. The SDN controller performs resource reservation, admission control and route calculation. When a flow is admitted or completed, the resource database is updated accordingly. Dynamic queue mapping for QoS routing in SDN is also provided. For a traffic flow with a certain traffic description and delay requirement, the queue mapping protocol dynamically assigns the flow to different priority queues at different switches along its routing path. Compared with the static mapping of a flow to a specified priority queue, the disclosed mapping is more flexible and uses network resources more efficiently.

25 Claims, 7 Drawing Sheets

```
DYNAMIC-QUEUE-MAP-ROUTE(G, T, K, s, t, d)
1  INITIALIZE(G, T, s, d)
2  Q ← V[G]
3  while Q is not empty
4      do u ← EXTRACT-MIN(Q)
5          if key[u]=∞ then exit
6          if u = t then RESOURCE-RESERVE-PATH(G, T, s, t)
7          for each v ∈ Adj[u]
8              do if mark[v]=FALSE
9                  then k ← ADMISSION-TEST(u, v, Xmin, d)
10                     if k ≥ 0 and k < K
11                         then kvalue ← DYNAMIC-EDGE-RELAX(u, v, k, d, p)
12                             DECREASE-KEY(Q, v, kvalue)
13         mark[u] ← TRUE
```

FIG. 2A

```
INITIALIZE(G, T, s, d)
1  For i ← 0 to |V|-1
2      mark[i] ← FALSE
3  For j=0 to T-1
4      d[i][j] ← ∞, d1[i][j] ← ∞
5      π[i][j] ← NIL, π1[i][j] ← NILL
6      q[i][j] ← (-1), q1[i][j] ← (-1)
7      pq[i][j] ← ∞, pq1[i][j] ← ∞
8  d[s][0] ← 0, d1[s][0] ← 0, key[s] ← 0
```

FIG. 2B

```
ADMISSION-TEST(u, v, Xmin, d)
1  for k ← 0 TO K-1
2      FLAG ← TRUE
3      for j ← k to K-1
4          if LBP(u, v)[j]+ceil (d[k]/Xmin)>d[k]*c(u, v)
5              then FLAG ← FALSE
6      if FLAG=TRUE return k
7  return -1
```

FIG. 3

DYNAMIC-EDGE-RELAX(u, v, k, d, p)
1  if k≥0 and k≤p
2      for i ← p to k
3          Δ ← p-i
4          w ← d[i] + d(u, v)
5          for j ← 0 to T
6              if j+Δ < T and d[v][j+Δ] > d[u][j]+w
7                  then PARAMETER-UPDATE(u, v, i, j, j+Δ, w, 0)
8              if j>0 and j≤Δ and d[v][Δ-j]>d1[u][j] + w
9                  then PARAMETER-UPDATE(u, v, i, j, Δ-j, w, 1)
10             if j>Δ and d1[v][j-Δ]>d1[u][j]+w
11                 then PARAMETER-UPDATE(u, v, i, j, j-Δ, w, 2)
12 k ← p+1
13 if k>p
14     then for i ← k to K
15         Δ ← i-p
16         w ← d[i]+d(u, v)
17         for j ← 0 to T
18             if j+Δ < T and d1[v][j+Δ] > d1[u][j]+w
19                 then PARAMETER-UPDATE(u, v, i, j, j+Δ, w, 2)
20             if j>0 and j<Δ and d1[v][Δ-j]>d[u][j] + w
21                 then PARAMETER-UPDATE(u, v, i, j, Δ-j, w, 3)
22             if j≥0 and d[v][j-Δ]>d[u][j] + w
23                 then PARAMETER-UPDATE(u, v, i, j, j-Δ, w, 0)

FIG. 4

PARAMETER-UPDATE(u, v, i, j, m, w, FLAG)
1 if FLAG=0 /* positive deviation to positive deviation */
2    then d[v][m] ← d[u][j]+w, π[v][m] ← u, q[v][m] ← i, pq[v][m] ← j
3 if FLAG=1 /* negative deviation to positive deviation
4    then d[v][m] ← d1[u][j]+w, π[v][m] ← u, q[v][m] ← i, pq[v][m] ← (-j)
5 if FLAG=2 /* negative deviation to negative deviation */
6    then d1[v][m] ← d1[u][j]+w, π1[v][m] ← u, q1[v][m] ← i, pq1[v][m] ← (-j)
7 if FLAG=3 /* positive deviation to negative deviation */
8    then d1[v][m] ← d[u][j]+w, π1[v][m] ← u, q1[v][m] ← i, pq1[v][m] ← j

FIG. 5

```
RESOURCE-RESERVE-PATH (G, T, s, t)
1  Key ← min(d[t][i], d1[t][i])
2  if key=d[t][k], then qx ← k, parent ← π[t][k], queue ← q[t][k]
3  if key=d1[t][k], then qx ← -k, parent ← π1[t][k], queue ← q1[t][k]
4  if parent=s
5     then RESOURCE-RESERVE-EDGE(s, t, Xmin, queue)
6     return
7  tmp ← t
8  while (parent≠s)
9     if (qx≥0)
10       then parent ← π[tmp][qx], queue ← q[tmp][qx], tpx ← pq[tmp][qx]
11    else
12       then parent ← π1[tmp][-qx], queue ← q1[tmp][-qx], tpx ← pq1[tmp][-qx]
13    RESOURCE-RESERVE-EDGE(parent, tmp, Xmin, queue)
14    qx ← tpx, tmp ← parent
15 return
```

FIG. 6

```
RESOURCE-RESERVE-EDGE(u, v, Xmin, queue)
1  for k ← queue to K
2      LBP(u, v)[k] ← LBP(u, v)[k]+ceil (d[k]/Xmin)
```

DYNAMIC PRIORITY QUEUE MAPPING FOR QOS ROUTING IN SOFTWARE DEFINED NETWORKS

PRIORITY

This application claims priority of U.S. Provisional Patent Application Ser. No. 61/872,487 filed Aug. 30, 2013 titled "DYNAMIC PRIORITY QUEUE MAPPING FOR QOS ROUTING IN SOFTWARE DEFINED NETWORKS", the teachings of which are incorporated herein by reference.

TECHNICAL FIELD

This disclosure is generally related to software defined networking (SDN), and more specifically to Quality of Service (QoS) routing.

BACKGROUND

Internet-based real-time applications such as video streaming, multiparty conferencing, Internet gaming and collaborative services have been increasing steadily and are predicted to see a robust growth in coming years. These applications require a performance guarantee expressed in terms of delay, bandwidth and loss rate, etc. In packet switched networks, packets from different flows interact with each other, making a Quality of Service (QoS) guarantee a challenging problem. Several QoS networking frameworks have been studied.

Integrated Service (IntServ) provides an end-to-end QoS guarantee but it does not scale well to large networks. For a flow of certain traffic specification, IntServ uses the RSVP protocol to set up a path and reserve resources at each node along the path. As per-flow states have to be maintained and admission tests have to be performed at each node, scaling is difficult.

Differentiated Service (DiffServ) is more scalable than IntServ, however end-to-end QoS is not guaranteed. In DiffServ, traffic is classified into different classes and a packet is forwarded based on per-hop behavior (PHB) at each router. DiffServ may assign higher priorities to traffic classified as a real-time application, but the QoS is unpredictable as different routers may define different PHBs for the same differentiated services code point (DSCP) bits.

Multi-Path Label Switching (MPLS) was originally designed to improve forward speed of routers. It uses traffic engineering and constraint-based routing technologies for resource management and QoS improvement for backbone Internet Protocol (IP) networks and enterprise Wide Area Network (WAN) applications. However, the control and management system of MPLS is complicated and expensive.

In many cases, instead of providing complicated and expensive QoS services, service providers use over provisioning and transport control protocol to partially solve the QoS problem.

QoS routing aims at selecting a network path that satisfies a set of QoS constraints of an application. These constraints can be either link constraints or path constraints. Link constraints, such as bandwidth, specify a QoS requirement imposed on a link. A path constraint specifies the end-to-end QoS requirement along a path. For an example, a delay constraint on a path is the upper bound of the summary of the delay on each link along the path. In general, link constraints are often easy to deal with. For an example, links with bandwidth lower than the requirement of an application can be pruned from the network graph. To identify a path that satisfies a path constraint, however, is more complicated. It has been proven that finding a feasible path satisfying multiple path constraints is NP complete. QoS routing has been studied extensively in the research community, many algorithms are proposed with a variety of constraints considered.

SDN is an emerging network architecture with the control plane decoupled from the data plane. In general terms, SDN has a centralized network controller, which communicates with network devices through a standard application programming interface (API), referred to as OpenFlow, for network configuration and management. In SDN, network resources can be dynamically configured to meet the constantly changing requirements of applications. SDN has better control over network resources which makes providing fine-grained QoS services viable.

SUMMARY

A QoS management scheme and SDN controller for SDN. Network resource availability of routers and switches are maintained in a central resource database of a SDN controller. The SDN controller performs resource reservation, admission control and route calculation. When a flow is admitted or completed, the resource database is updated accordingly. Dynamic queue mapping for QoS routing in SDN is also provided. For a traffic flow with a certain traffic description and delay requirement, the queue mapping protocol dynamically assigns the flow to different priority queues at different switches along its routing path. Compared with the static mapping of a flow to a specified priority queue, the disclosed mapping is more flexible and uses network resources more efficiently.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a dynamic edge relax procedure;

FIG. 5 illustrates a parameter update procedure;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged embodiment.

In the present disclosure, a new QoS management scheme/process is provided for SDNs. In this disclosure, network resource availability of routers and switches are maintained in a central resource database of the SDN controller. The SDN controller performs resource reservation, admission control and route calculation. When a flow is admitted or completed, the resource database is updated accordingly.

The present disclosure also provides dynamic queue mapping for QoS routing in SDNs. For a traffic flow with a certain traffic description and delay requirement, this queue mapping protocol dynamically assigns the flow to different priority queues at different switches along its routing path. Compared with the static mapping of a flow to a specified priority queue, the disclosed mapping is more flexible and uses network resources more efficiently.

Figure 1A:
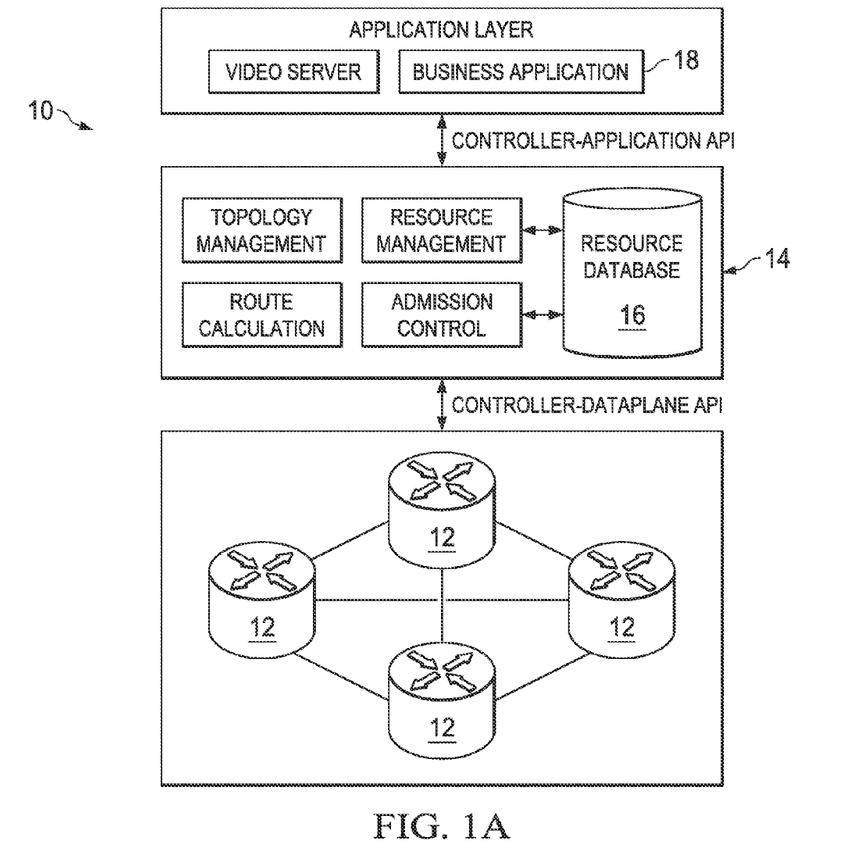
FIG. 1A illustrates an architecture of QoS management scheme for an SDN.

FIG. 1A illustrates one example embodiment of an architecture including a new QoS management scheme and process in an SDN 10 according to this disclosure.

In this architecture and apparatus/method, routers and switches 12 register their resource availability with an SDN controller 14, and the SDN controller 14 records this resource availability information in a resource database 16 forming part of the SDN controller 14. When an application 18 in an application layer sends its QoS requirement to the SDN controller 14 via a controller-application API, the QoS requirement includes information including traffic description, service starting time and end time, service priority, etc. Once the SDN controller 14 receives the service request, it performs admission control, route calculation and resource reservation for the application 18. If an application is admitted, the SDN controller 14 updates a forwarding table in the respective routers and switches 12 along the forwarding path, and the resource information for these network elements is updated accordingly in resource database 16.

Figure 1B:
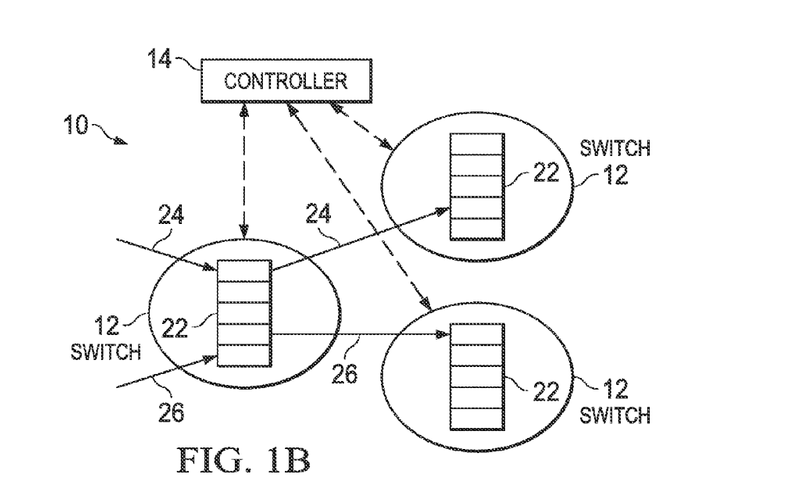
FIG. 1B illustrates dynamic mapping of flows to different queues at different nodes in SDN.

In addition, a QoS routing protocol for use in SDN 10 for route calculation and admission control for application flows is disclosed and described herein. For a traffic flow with certain bandwidth and delay requirements, this QoS protocol dynamically assigns the application flow to different priority queues 20 at different switches 12 along its routing path based on local traffic conditions, as shown in FIG. 1B. Compared with static mapping of an application flow to a specified priority queue, this dynamic mapping is more flexible and uses the network resources including switches and routers 12 more efficiently.

Currently, the SDN Openflow protocol provides limited functionality for QoS management. A queue with a minimum bandwidth guarantee is called network slice. Queue configuration is currently not addressed by or part of the Openflow protocol, but Openflow has defined primitives to retrieve queue configuration information and queue statistics. Openflow has also defined an interface to map a flow to a queue. Static mapping of a flow into the same priority queue based on Type-of-Service (ToS) bits in an IP header or Priority Code Point bits in a VLAN tag may not use network resources efficiently. For example, for two respective flows with the same delay requirements, the flow with fewer hops may be mapped to lower priority queues than the other flow. On the other hand, a flow admitted to a priority queue in one node may not be able to get admitted to the same priority queue on the other node along the path as local traffic conditions may be different.

The SDN controller 12 has knowledge and information of the network topology and the flow states at each node. Advantageously, in this disclosure, when the SDN controller 14 selects a path through network resources including network nodes and links for a flow from its source to its destination, the SDN controller 14 also dynamically maps the flow to different priority queues at different nodes in SDN 10 based on local traffic conditions, at the same time, satisfying the end-to-end QoS requirements of the flow.

The following describes one example of a routing problem.

Given a directed graph G(V, E), where V is the set of nodes and E the set of edges, a directed edge e(i, j) has a tail node i and a head node j, traffic is always sent from the tail to the head of the edge. Each edge e(i, j) has a bandwidth capacity c(i, j) and a transmission delay d(i, j) associated with it. Assume a rate-controlled static-priority (RCSP) queueing service discipline is adopted. The tail of an edge is associated with K priority queues, 0, 1, . . . K−1, where queue 0 has the highest priority and queue K−1 has the lowest priority. Based on RCSP, each queue k has a bounded queue delay d[k], with d[0]<d[1]< . . . <d[K−1]. For a flow from source node s to destination node t with priority ρ, the routing problem is to find a minimum delay path from node s to node t. The routing problem is to find a path P that minimize:

$$\sum_{e(i,j) \in P} d[\rho] + d(i, j) \tag{1}$$

On each edge e(i, j) along path P, admission conditions also have to be satisfied. Let the flow properties be described by ($X_{min}$, $X_{ave}$, I, B), where $X_{min}$ is the minimum packet interval, $X_{ave}$ is the average packet interval during a define period, I is the length of the defined period, and B is the maximum packet size. If a flow is to be admitted to priority queue k, the following condition has to be satisfied:

$$LBP(i, j)[m] + \left\lceil \frac{d[m]}{X_{min}} \right\rceil B \le c(i, j)d[m] \qquad (2)$$

$$\text{for } m = k,$$

$$k + 1, \ldots K - 1.$$

Where LBP(i, j) [m] is the LongestBusyPeriod on priority queue m of edge e(i, j). This problem can be solved using Dijkstra's algorithm.

As previously noted, static mapping of a flow to a priority queue is not flexible and may not use network resources 12 efficiently. In SDNs, an SDN controller has available all the information about network topology and traffic conditions at each node 12. Therefore, it is possible for the SDN controller 14 to map a flow to different priority queues 22 at different nodes 12 while maintaining some degree of fairness and efficiency of network resource usage. Here, fairness means that a flow is assigned to queues 22 not variant far away from its assigned priority. For example, a flow of priority ρ can be assigned to priority queue ρ−1 at one node 12 and priority queue ρ+1 at another node 12. For this purpose, a parameter h is introduced to measure the distance of the priority queues 22 actually mapped to the flow along a path to the priority queue 22 assigned to the flow. For a flow of priority ρ, the flow is mapped to q(i, j) on e(i, j) on path P shown at 24 in FIG. 1B. For a flow with assigned priority ρ, h is defined as:

$$h = \sum_{e(i,j) \in P} q(i, j) - \rho$$

with $$q(i, j) \in \{0, 1, \ldots K - 1\}$$

One goal is to find a minimum delay path for the flow that is not mapped exactly to priority queue ρ and the total deviation is below some threshold. The dynamic queue mapping and routing problem is defined as:

$$\text{Minimize} \sum_{e(i,j) \in P} d[q(i, j)] + d(i, j)$$

subject to |h|≤T; where |h| is the absolute value of h, and T is a threshold value which defines the amount of deviation the flow is mapped from priority ρ. T=0 is a special case when there is no deviation or the deviation to the positive direction equal to the deviation to the negative direction.

A modified Dijkstra's algorithm is utilized to solve this problem. For each node i, two T dimension delay queues are maintained, d[|V|][T] and d1[|V|][T], where element d[i][j] records the minimum distance from source node s to node i with positive or zero queue deviation h=j; d1[i][j] records the minimum distance from node s to node i with negative queue deviation h=−j; π[i][j] records the parent node of i that results in the delay measurement of d[i][j]; π1[i][j] records the parent node of i that results the delay measurement of d1[i][j]; q[i][j] records the priority queue assigned to the flow on the edge lead from the parent node of i to node i that results the delay measurement of d[i][j]; and q1[i][j] records the priority queue assigned to the flow on the edge lead from the parent node of i to node of i that results the delay measurement of d1[i][j].

It should be noted that a node 12 may have different parents for shortest delay to the source with different accumulated queue deviation value. For easy back tracing, two arrays pq[i][j] and pq1[i][j] are used to record from which delay measurements in parent node i−1 that results the delay measurement d[i][j] and d1[i][j] respectively in node i. Elements pq[i][j] and pq1[i][j] can be positive or negative. For example, if d[i][j] is derived based on d[i−1][k], then pq[i][j]=k; on the other hand, if d[i][j] is derived based on d1[i−1][k], then pq[i][j]=−k.

All the nodes 12 are put into a priority queue Q according to their accumulated delay to the source node. To find the minimum delay to a destination node with overall queue mapping deviation equals 0, the priority queue is keyed by d[i][0], otherwise, if a queue mapping deviation of T is allowed, the priority queue is keyed by the minimum of d[i][j], where key[i] is used to represent key value of node i.

Figure 2A:
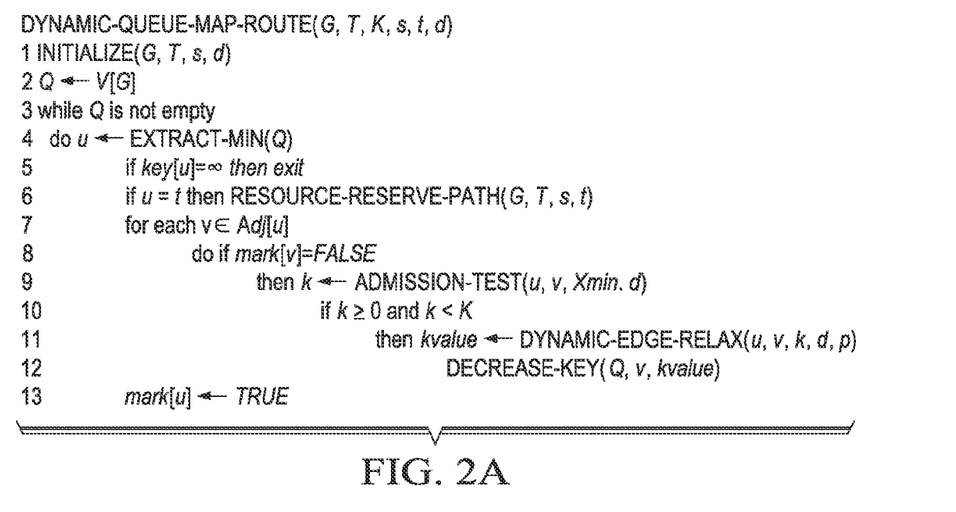
FIG. 2A illustrates a dynamic queue mapping and routing algorithm.
Figure 2B:
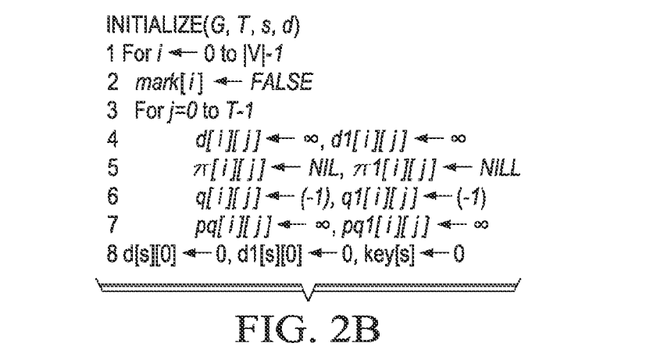
FIG. 2B illustrates a parameter initialization procedure.
Figure 3:
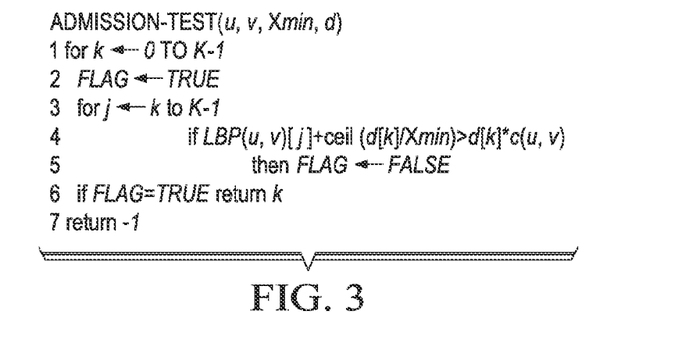
FIG. 3 illustrates an admission test procedure.
Figure 6:
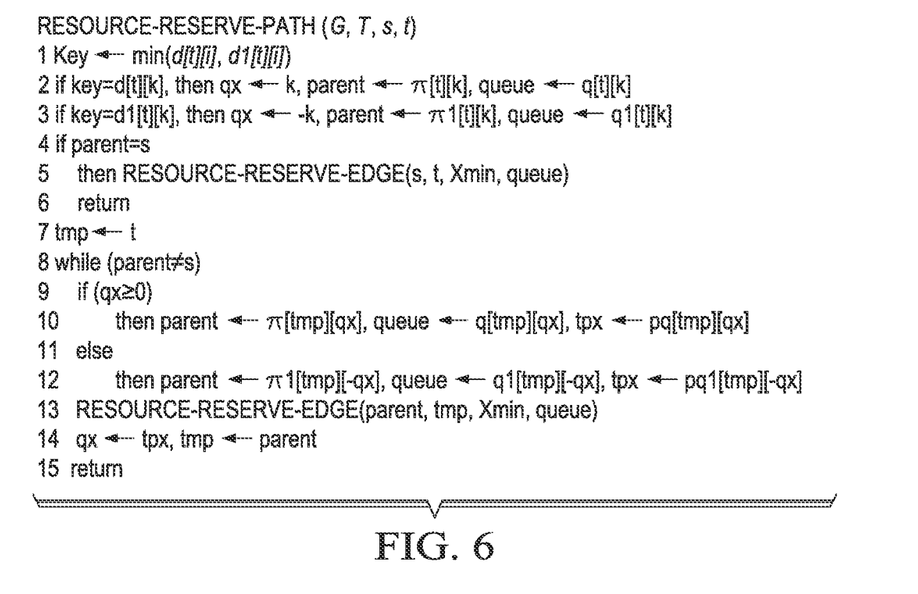
FIG. 6 illustrates a path resource reservation procedure.
Figure 7:
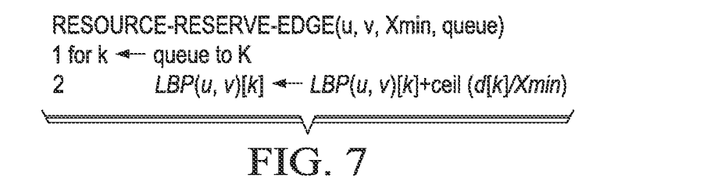
FIG. 7 illustrates an edge resource reservation procedure.
Figure 8:
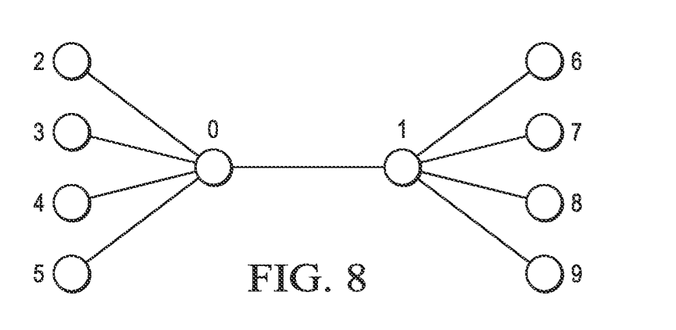
FIG. 8 illustrates a dumbbell topology.

FIG. 2A shows a dynamic queue mapping and routing algorithm according to one example embodiment. After all the parameters described above are initialized, as shown in FIG. 2B, and a priority queue Q has been built, a node u with minimum value is extracted from the queue (extract min and decrease key are standard priority queue operations and are not presented here). For a neighboring node v of node u, an admission test is performed on edge e(u, v) according to a RCSP service discipline shown in FIG. 3.

If the flow cannot be admitted to any of the queues, the admission test fails and the algorithm continues to the next neighboring node of u. If the admission test succeeds, the admission test returns the highest queue this flow can be admitted to, and edge e(u, v) is then relaxed based on the dynamic edge relax procedure shown in FIG. 4 and the delay value of node v to s and other parameters is updated using a parameter update procedure shown in FIG. 5, and a decrease key operation is performed on priority queue Q. When all the neighboring nodes of node v have been checked, node v is marked as visited. If priority queue Q is not empty, the next node with minimum value is extracted and the procedure described above is repeated.

If the extracted node has a neighbor node that is marked as visited, that neighboring node is ignored. If the extracted node has a distance value of infinity to the source node, it means no route with the required resource can be found to that node, and thus to the destination node, the algorithm will exit. If the extracted node is the destination node, a route to the destination has been found and a resource will be reserved using the back trace method as described in FIGS. 6 and 7.

An important procedure is dynamic edge relax. Assume a flow with assigned priority of ρ, the highest priority queue that the flow can be mapped on edge e(u,v) is k. If k≤ρ, this means that the flow can be mapped to a queue i which is higher than or equal to its assigned priority ρ. By definition, d[u][j] is the minimum delay on node u with positive or zero accumulated queue mapping deviation of j. Assume the flow is mapped to queue i with k≤i≤ρ, let Δ=ρ−i. The positive accumulated queue mapping is increased by Δ when this edge is relaxed, this is described by line 6 and 7 in the dynamic edge relax procedure of FIG. 4. On the other hand, d1[u][j] is the minimum delay on node u with negative accumulated queue mapping deviation of j. If j≤Δ, the negative deviation j on node u will be changed to positive or zero deviation Δ−j on node v, as described by line 8 and 9 in dynamic edge relax procedure of FIG. 4. If j>Δ, the deviation on node u will remain as negative deviation on node v, but will be decreased by a number of Δ, as shown in line 10 and 11 of the dynamic edge relax procedure of FIG. 4.

A similar method/analysis can be used when the flow is mapped to a queue i that is greater than its assigned priority queue ρ, which is covered by line 12 to 23 in dynamic edge relax procedure of FIG. 4.

When a route has been found, resource(s) need to be reserved along the path. Starting from destination node t, if the objective is to find the minimum delay with accumulative queue mapping value of 0, that is d[t][0] is the objective value, the parent node of node t is π[t][0], and the flow is mapped to q[t][0] from the parent node to node t, also d[t][0] is derived from d[π[t][0]][pq[t][0]] from the parent node. The parent of the parent node would then be π[π[t][0]][pq[t][0]] and so on until the source node is reached. Each time a parent node and the queue on which the flow is mapped are found, resource(s) are reserved between the parent node and the node. The same method can be used when the objective is to find the minimum delay for the accumulated queue mapping deviation of certain threshold. The details of back tracing and resource reservation are described in FIGS. 6 and 7.

Simulation Results

Figure 9:
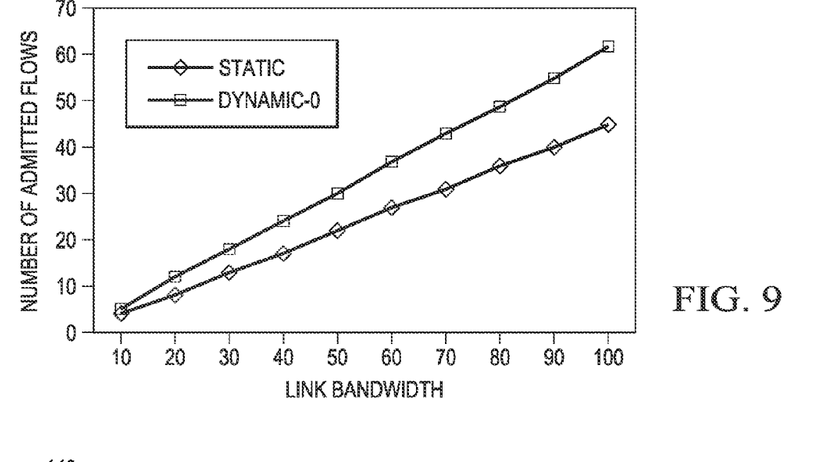
FIG. 9 illustrates the number of admitted flows when edge bandwidth changes.
Figure 10:
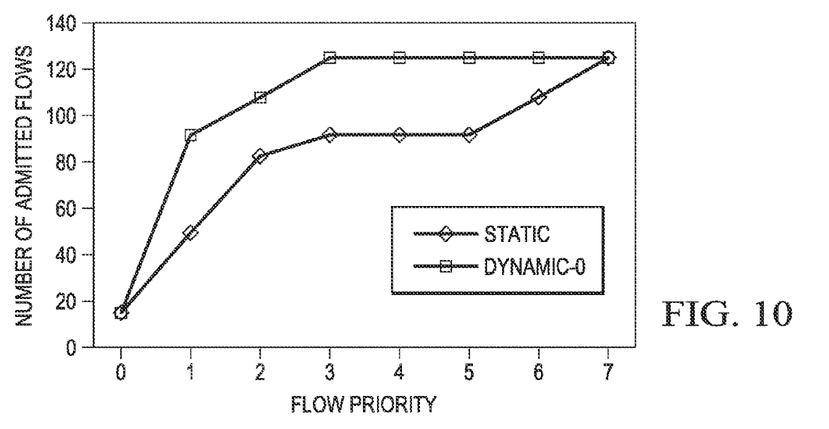
FIG. 10 illustrates the number of admitted flows when flow priority changes.

With the accumulated queue mapping deviation of zero, the algorithm is more flexible than the static mapping and can use network resources more efficiently. Consider a simple 10-node dumbbell graph shown in FIG. 8. Each edge has the same bandwidth and has 8 priority queues associated with it. Flows are sent from nodes 2, 3, 4, 5 to nodes 6, 7, 8, 9. Each flow has the same packet size of 1500 bytes, Xmin of 10 ms. FIG. 9 illustrates the number of admitted flows of static and dynamic queue mapping when the flows are set to the same priority of 4, and the bandwidth of edges changes from 10 Mbps to 100 Mbps. FIG. 10 illustrates the number of admitted flows when the edges bandwidth is set to 200 Mbps and the flows priority changed from 0 to 7. For both cases, it is apparent that dynamic mapping admits more flows than static mapping.

Consider the cases when the queue mapping deviation is set to some threshold. Random connected graphs are generated with different numbers of nodes. The bandwidth of the edges is uniformly distributed between 50 Mbps to 100 Mbps, the transmission delay is distributed between 10 ms to 20 ms. The average degree of nodes is set to 3. Each edge is associated with 8 priority queues, the delay bound of the priority queues 0 to 7 are set to 1, 3, 5, . . . 15 respectively. Flows are generated with a random source and destination. The Xmin of the flows are uniformly distributed between 2 to 6 ms, the maximum packet size are distributed between 500 to 1500 bytes. Each flow is assigned a priority randomly distributed between 0 to 7. For dynamic mapping, two cases are studied with accumulated deviation threshold values set to 8 and 16, and are referred to as dynamic-8 and dynamic-16, respectively. All the flows are set to the same delay constraints. A flow can be rejected if its admission test failed or its delay constraints are violated. For all the simulation, 1000 random flows are generated.

Figure 11:
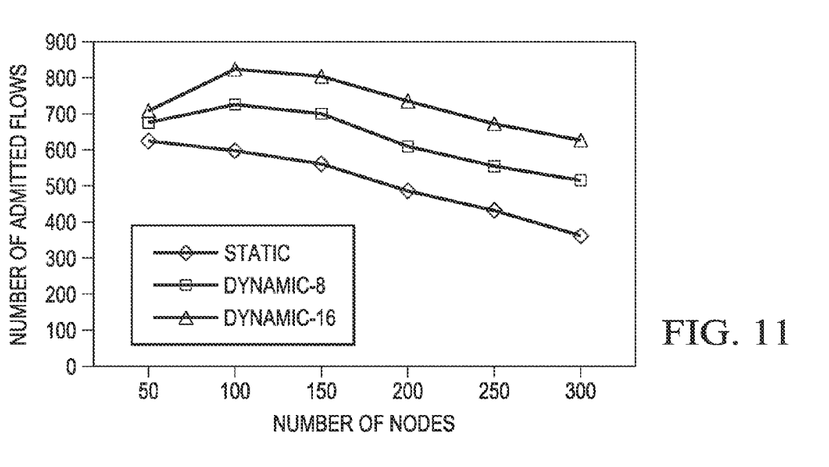
FIG. 11 illustrates the number of admitted flows when delay constraints is 100 ms.
Figure 12:
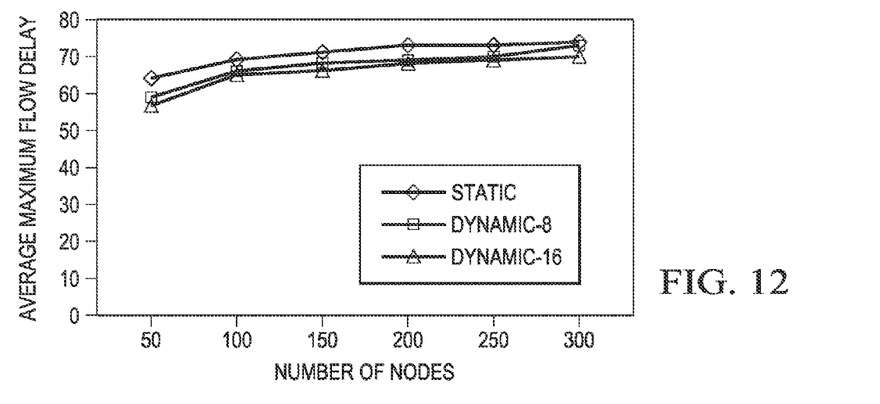
FIG. 12 illustrates an average maximum delay of flows, delay constraints 100 ms.
Figure 13:
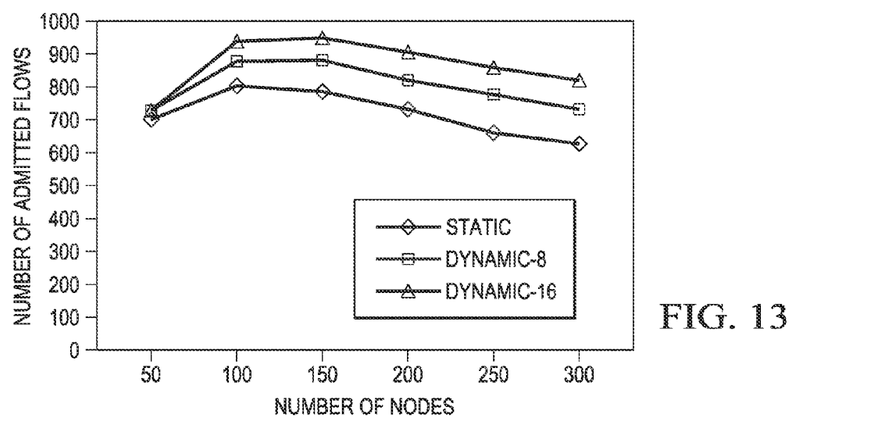
FIG. 13 illustrates the number of admitted flows when delay constraints is 125 ms.
Figure 14:
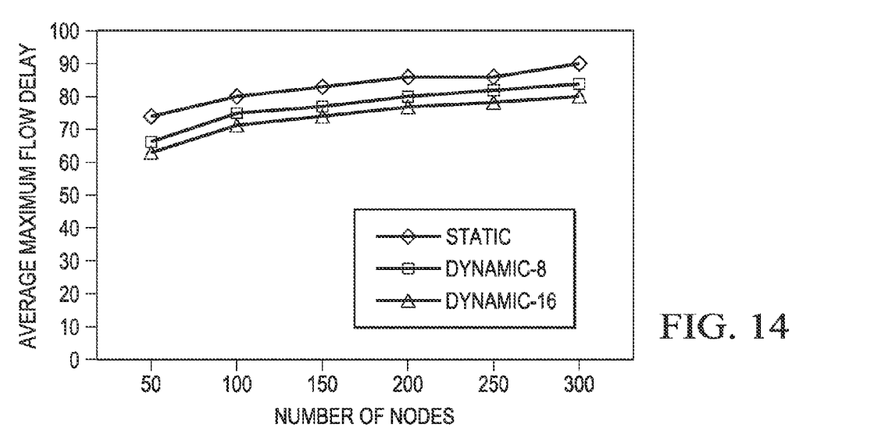
FIG. 14 illustrates an average maximum delay of flows, delay constraints 125 ms.

FIGS. 11 and 12 show the number of admitted flows and the average maximum delay of flows when the number of nodes changes from 50 to 300 and the delay constraint is set to 100 ms. FIGS. 13 and 14 show the results when the delay constraint is 125 ms. When the number of nodes is 50, there are several flows rejected because of the failed admission test; for all the other cases, flows are rejected because of delay constraint violation.

Figure 15:
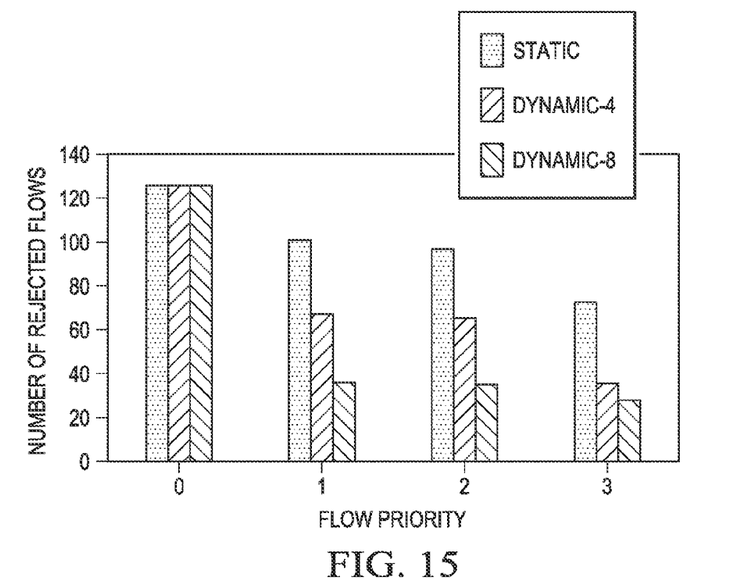
FIG. 15 illustrates the number of rejected flows for graph of 100 nodes.
Figure 16:
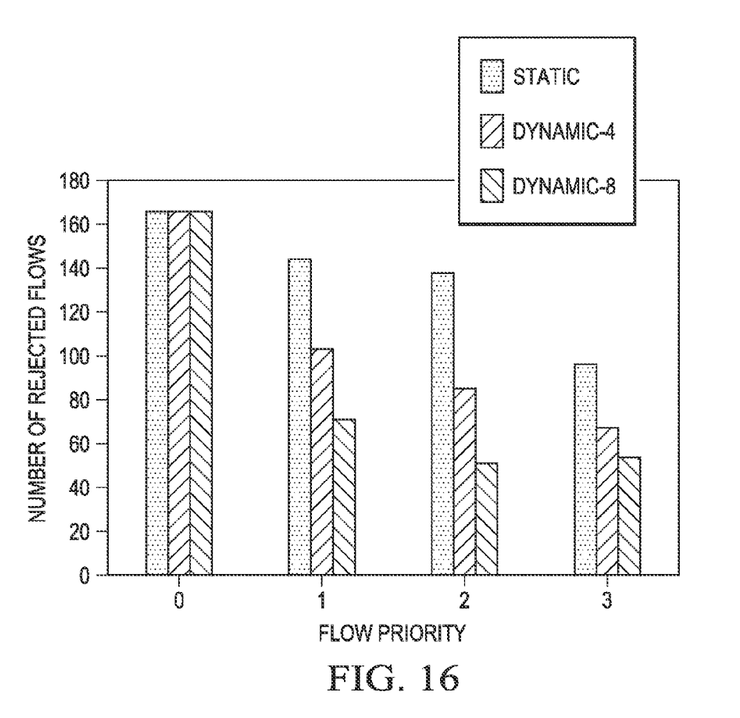
FIG. 16 illustrates the number of rejected flows for graph of 200 nodes.

The cases when flows of different priorities are assigned different delay constraints are studied. In a random graph, each edge is associated with four priority queues, 0, 1, 2, 3. The delay bound of the queues are 4, 8, 12 and 16 milliseconds respectively. Flows assigned to priority 0, 1, 2, 3 are assigned end-to-end delay constraints of 75, 100, 125 and 150 milliseconds respectively. Nodes average degree, bandwidth and transmission delay distribution are the same as above. Dynamic queue mapping deviation are set to 4 and 8. One thousand random flows are generated. FIGS. 15 and 16 show the number of rejected flows of different priorities when the number of nodes in random graphs are set to 100 and 200. It can be seen that the rejected number of flows of priority 0 are the same for static and dynamic queue mapping. For other flows of other priorities, dynamic mapping rejects less flows than static mapping, and the dynamic mapping with larger deviation value has a better performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of queue mapping for quality of service (QoS) routing implemented in a software defined networking (SDN) controller, the method comprising:

obtaining, via a receiver, network topology information regarding an SDN architecture;

receiving, via the receiver, a request for an application flow from a source node to a destination node that is associated with a QoS requirement and a flow priority value;

admitting, via a processor coupled to the receiver, the application flow;

determining, via the processor, a plurality of candidate routing paths within the SDN architecture from the source node to the destination node that satisfy the QoS requirement based on the application flow, wherein each candidate routing path traverses a plurality of nodes within the SDN architecture and is associated with a priority queue on each of the nodes, and wherein each priority queue is associated with a queue priority value and has a bounded queue delay;

selecting a routing path from the candidate routing paths that has a lowest aggregate bounded queue delay of the included priority queues, wherein the routing path is selected from the candidate routing paths when a summation of a difference between each of the priority values of the priority queues included within the routing path and the flow priority value is within a defined threshold, wherein the summation is defined by $$\sum_{e(i,j) \in P} |q(i, j) - \rho| < T,$$

wherein q(i, j) is each of the priority values of the priority queues included within the routing path, wherein ρ is the flow priority value, wherein P is the routing path that is selected, wherein e(i, j) is an edge on the path from node i to node j, and wherein T is the defined threshold; and sending, via a transceiver coupled to the processor, a forwarding table update for the application flow to each of the nodes along the routing path.

2. The method as specified in claim 1, further comprising maintaining network resource availability of network nodes in the SDN architecture in a resource database.

3. The method as specified in claim 2, further comprising updating the resource database when the application flow is admitted or completed.

4. The method as specified in claim 3, wherein the resource database is associated with the SDN controller.

5. The method as specified in claim 1, further comprising dynamically mapping the application flow to different priority queues at different nodes based on local traffic conditions, at the same time, and satisfying wherein the application flow is dynamically mapped to the different priority queues at the different nodes to satisfy the QoS requirement.

6. The method as specified in claim 5, wherein all the nodes are put into a queue according to their accumulated delay value with respect to a selected node.

7. The method as specified in claim 6, wherein a node u with a minimum delay value is extracted from a priority queue Q, and if the application flow cannot be admitted to any of the other priority queues, an admission test fails and the method continues to a next neighboring node of node u.

8. The method as specified in claim 7, wherein if the admission test succeeds, the admission test returns a highest priority queue the application flow can be admitted to, and an edge is then relaxed based on a dynamic edge relax procedure and a delay value of the neighboring node to the selected node is updated using a parameter update procedure, and a decrease key operation is performed on priority queue Q.

9. The method as specified in claim 8, wherein when all neighboring nodes of node v have been checked, node v is marked as visited.

10. The method as specified in claim 9, wherein if priority queue Q is not empty, a next node with a minimum delay value is extracted.

11. A software defined networking (SDN) controller, comprising:
a receiver configured to:
obtain network topology information for an SDN architecture; and
receive a request for an application flow from a source node to a destination node that is associated with a quality of service (QoS) requirement and a flow priority value; and
a processor coupled to the receiver and configured to:
admit the application flow;
determine a plurality of candidate routing paths within the SDN architecture from the source node to the destination node that satisfy the QoS requirement based on the application flow, wherein each candidate routing path traverses a plurality of nodes within the SDN architecture and is associated with a priority queue on each of the nodes, and wherein each priority queue is associated with a queue priority value and has a bounded queue delay; and
select a routing path from the candidate routing paths that has a lowest aggregate bounded queue delay of the included priority queues, wherein the routing path is selected from the candidate routing paths when a summation of a difference between each of the priority values of the priority queues included within the routing path and the flow priority value is within a defined threshold, wherein the summation is defined by $$\sum_{e(i,j) \in P} |q(i,j) - \rho| < T,$$

wherein $q(i, j)$ is each of the priority values of the priority queues included within the routing path, wherein $\rho$ is the flow priority value, wherein P is the routing path that is selected, wherein $e(i, j)$ is an edge on the path from node i to node j, and wherein T is the defined threshold; and
a transmitter coupled to the processor and configured to send a forwarding table update for the application flow to each of the nodes along the routing path.

12. The SDN controller as specified in claim 11, wherein the processor is further configured to maintain network resource availability of network nodes in the SDN architecture in a resource database.

13. The SDN controller as specified in claim 12, wherein the processor is configured to update the resource database when the application flow is admitted or completed.

14. The SDN controller as specified in claim 11, wherein the processor is configured to dynamically map the application flow to different priority queues at different nodes based on local traffic conditions, at the same time, and satisfy an end-to-end QoS requirement of the application flow.

15. The SDN controller as specified in claim 14, wherein the processor is configured to put all the nodes into a queue according to their accumulated delay value with respect to a selected node.

16. The SDN controller as specified in claim 15, wherein the processor is configured to extract a node u with a minimum delay value from a priority queue Q, and if the application flow cannot be admitted to any of the other priority queues, continue to a next neighboring node of node u.

17. The SDN controller as specified in claim 16, wherein the processor is configured such that if the application flow can be admitted, return a highest priority queue the application flow can be admitted to, relax an edge based on a dynamic edge relax procedure and update a delay value of the neighboring node to the selected node using a parameter update procedure, and a decrease key operation on priority queue Q.

18. The SDN controller as specified in claim 17, wherein the processor is configured such that when all neighboring nodes of node v have been checked, node v is marked as visited.

19. The SDN controller as specified in claim 18, wherein the processor is configured such that if priority queue Q is not empty, a next node with a minimum delay value is extracted.

20. The method as specified in claim 1, wherein an aggregate queue delay for each of the nodes in the routing path is based on a rate-controlled static-priority.

21. The method as specified in claim 1, wherein the application flow satisfies an admission condition for each of the priority queues included in the candidate routing paths.

22. The SDN controller as specified in claim 11 further comprising a transceiver coupled to the processor and configured to send a forwarding table update regarding the application flow to each of the nodes along the routing path.

23. The SDN controller as specified in claim 11, wherein an aggregate queue delay for each of the nodes in the routing path is based on a rate-controlled static-priority.

24. The SDN controller as specified in claim 11, wherein the application flow satisfies an admission condition for each of the priority queues included in the candidate routing paths.

25. An apparatus, comprising:
- a receiver configured to receive a request for an application flow from a source node to a destination node that is associated with a quality of service (QoS) requirement and a flow priority value; and
- a processor coupled to the receiver and configured to:
  - admit the application flow;
  - determine a plurality of candidate routing paths from the source node to the destination node that satisfy the QoS requirement based on the application flow, wherein each candidate routing path traverses a plurality of nodes and is associated with a priority queue on each of the nodes, wherein each priority queue is associated with a queue priority value and has a bounded queue delay, and wherein the flow priority value is associated with a first queue priority value;
  - dynamically map the application flow to different priority queues at different nodes for each of the candidate routing paths based on local traffic conditions, wherein at least one of the different priority queues is associated with a second queue priority value that is different from the first queue priority value; and
  - select a routing path from the candidate routing paths that has a lowest aggregate bounded queue delay of the included priority queues, wherein the routing path is selected from the candidate routing paths when a difference between the second queue priority value and the first queue priority value is within a defined threshold; and
- a transmitter coupled to the processor and configured to send a forwarding table update for the application flow to each of the nodes along the routing path.

* * * * *